United States Patent Office 3,498,780
Patented Mar. 3, 1970

3,498,780
HERBICIDAL METHOD
Quentin F. Soper and Granville B. Kline, Indianapolis, Ind., assignors to Eli Lilly and Company, Indianapolis, Ind., a corporation of Indiana
No Drawing. Filed Jan. 7, 1963, Ser. No. 249,580
Int. Cl. A01n 9/14
U.S. Cl. 71—103          12 Claims

ABSTRACT OF THE DISCLOSURE

This invention relates to herbicidal compositions and methods employing compositions in which an arylsulfonamide is the herbicidally active ingredient.

---

This invention relates to novel herbicidal compositions having broad though selective herbicidal activity and to herbicidal processes employing these compositions. More particularly, this invention concerns novel herbicidal processes employing compositions in which an arylsulfonamide is the herbicidally active ingredient.

In the past, several types of broad spectrum herbicides have been available which could be used for killing dicotyledonous plants. One of these types includes 2,4-dichlorophenoxyacetic acid and related compounds. The monocotyledonous plants, which include the grasses, are not greatly affected by this type of herbicide, but only by nonselective herbicides such as sodium arsenite, aminotriazole, sodium chlorate, and ammonium sulfamate, all of which effectively destroy all types of vegetation. Only a few compounds have been found which will destroy monocotyledonous plants such as grasses, preferentially to dicotyledonous plants, and only a very few compounds, among them diphenylacetonitrile and N,N-dimethyldiphenylacetamide, have been found which can destroy grasses and only certain classes of broadleaf plants.

It is an object of this invention to provide compositions which are toxic to both grasses and broadleaf weeds in their germinating stage, but which are nontoxic to broadleaf crop plants. It is a further object of this invention to provide novel compositions and processes which can eliminate weed grasses and certain broadleaf weeds selectively from crop plants such as corn, cotton, and soybeans and their close relatives in the plant kingdom.

In fulfillment of the above and other objects, this invention provides a novel process and compositions for inhibiting the growth of weed grasses and broadleaf weeds. The novel process comprises applying to an area infested with weed seeds a herbicidal amount of a phenylsulfonamide as represented by the following formula:

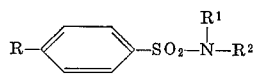

wherein R is —NO$_2$, —NH$_2$, or —NHCO—R$^3$; R$^1$ is hydrogen, C$_1$–C$_6$ alkyl, or C$_2$–C$_4$ alkenyl; R$^2$ is hydrogen or —CO—R$^3$; and R$^3$ is C$_1$–C$_6$ alkyl, C$_1$–C$_6$ haloalkyl, or aryl. In the above groups, alkyl radicals can be illustratively methyl, ethyl, n-propyl, isopropyl, n-butyl, sec.-butyl, isobutyl, n-amyl, isoamyl, n-hexyl, 3-methylpentyl, and the like. Alkenyl radicals can be illustratively vinyl, allyl, methallyl, crotyl, 3-methyl-1-propenyl, and the like. Haloalkyl radicals can be illustratively chloromethyl, trichloromethyl, trifluoromethyl, 1-bromoethyl, 2-chloroethyl, 3-chloropropyl, 4-bromobutyl, 5-chloroamyl, and the like. Halo in haloalkyl can be fluorine, chlorine, bromine, iodine, and astatine. Aryl preferably is a monocyclic aryl radical such as phenyl or substituted phenyl, for instance p-chlorophenyl, o-chlorophenyl, m-chlorophenyl, o-tolyl, m-tolyl, p-tolyl, o-anisyl, m-anisyl, p-anisyl, o-bromophenyl, m-bromophenyl, p-bromophenyl, o-trifluoromethylphenyl, p-trifluoromethylphenyl, m-trifluoromethylphenyl, and the like; furyl or substituted furyl such as 2-chlorofuryl, 3-chlorofuryl, 2-methylfuryl, 3-methylfuryl, 2-bromofuryl, 3-bromofuryl, 2-methoxyfuryl, 3-hydroxyfuryl, 2-trifluoromethylfuryl, 3-trifluoromethylfuryl, and the like; thienyl or substituted thienyl such as 2-chlorothienyl, 3-chlorothienyl, 2-bromothienyl, 3 - bromothienyl, 2-methylthienyl, 3-methylthienyl, 2-methoxythienyl, 3-methoxythienyl, 2-hydroxythienyl, 3-hydroxythienyl, 2 trifluoromethylthienyl, and the like; pyridyl or substituted pyridyl such as 2-chloropyridyl, 3-chloropyridyl, 4-chloropyridyl, 2-bromopyridyl, 3-bromopyridyl, 4-bromopyridyl, 2-methoxypyridyl, 3-methoxypyridyl, 4-methoxypyridyl, 2-methylpyridyl, 3-methylpyridyl, 4-methylpyridyl, 2-trifluoromethylpyridyl, 3-trifluoromethylpyridyl, 4-trifluoromethylpyridyl, and the like.

As examples of compounds which have the desired herbicidal activity and which can be successfully employed as weed-killing agents in accordance with the process of this invention there may be mentioned N$^1$-acetylsulfanilamide, N$^1$,N$^4$-diacetylsulfanilamide, N$^1$-benzoylsulfanilamide, N$^1$ - α-thenoylsulfanilamide, N$^1$,N$^4$-bistrichloroacetylsulfanilamide, N$^4$ - succinyl - N$^1$-benzoylsulfanilamide, N$^1$ - (2-chlorobenzoyl)sulfanilamide, N - chloroacetyl-p-nitrobenzenesulfonamide, N-isobutyryl - p - nitrobenzenesulfonamide, 3-sulfanilylpentane, and trichloroacetylsulfanilylallylamide.

Compounds possessing the above structures preferably are formulated for use as pre-emergent selective herbicides either as dusts, spray concentrates, spreadable granules, or wettable powders. The compounds are quite insoluble in water and for the preparation of emulsion-type sprays or wettable powders, the compounds desirably are formulated with a wetting agent or surfactant. The wetting agent or surfactant used in formulating the emulsion-type sprays or wettable powders can be illustratively polyoxyethylene sorbitan mono-laurate, polyoxyethylene sorbitan mono-oleate, polyglycol ether sulfonates, alkylamine dodecylbenzenesulfonate, and the like. In the preparation of spreadable granules, the insert diluent used can be calcined attapulgite clay. Dispersions can be prepared on herbicidally inert carriers such as vermiculite, peat moss and the like.

The novel process of this invention comprises treating a soil area or locus infested with weed grass seeds and broadleaf weed seeds with a dust, granular formulation, or spray containing a compound coming within the scope of the above formula as the herbicidally active ingredient. Typical of soil areas which can be treated are turfs or sods such as bluegrass turf, Zoysia turf, St. Augustine turf, bentgrass turf, fescue turf, Bermuda turf, or mixtures of these containing in addition seeds or seedlings of undesirable grasses; crop-growing areas in which crops other than grasses are being grown; flower beds, strawberry patches, and similar areas of cultivation; and in other miscellaneous places such as gravel driveways, clay tennis courts, walks, road shoulders, and the like, where the elimination of grasses is desired. Compositions containing the herbicidally active compound are sprayed, dusted, or spread by other methods well known to the art onto the particular area at the rate of around 2 to 32 pounds per acre or somewhat more if necessary; for example, 50 pounds active ingredient per acre. For most field applications, we prefer to spray or dust the herbicidal compositions of this invention at the rate of about 4 to 16 pounds of active ingredient per acre. If, however, the herbicidal compositions are spread in a granular form over the area to be treated, we prefer to employ a greater amount of active material per acre, suitably in the range of about 8 to 16 pounds of an active arylsulfonamide.

Seedlings and germinating seeds of many varieties of grasses are killed by the above treatment process, including both undesirable grasses such as the crabgrasses (*Digitaria sanguinalis* and *Digitaria ischaemum*); green and yellow foxtails (*Setaria viridis* and *Setaria lutescens*); goose grass (*Eleusine indica*); sandbur (*Cenchrus pauciflorus*); witchgrass (*Panicum capillare*); and the like, as well as the germinating seeds of desirable grasses such as Bermuda grass (*Cynodon dactylon*); Kentucky bluegrass (*Poa pratensis*, including both Merion and Delta strains); fescue (*Festuca elatior*); domestic oats (*Avena sativa*); orchard grass (*Dactylis glamerata*); red top (*Agrostis alba*); rye (*Secale cereale*); Italian ryegrass (*Lolium multiflorum*); timothy (*Phleum pratense*); wheat (*Triticum sestivum*); and the like.

As previously stated, the herbicidal compositions of this invention do not affect leguminous plants in the pre-emergent, germinating stage of growth. Among the leguminous plants which will tolerate concentrations of the herbicidal compositions of this invention sufficient to eliminate grasses in the pre-emergent growth stage are the following: alfalfa (*Medicago sativa*); bush or pole beans (*Phaseolus vulgaris*); crimson clover (*Trifolium incarnatum*); Dutch white clover and Ladine clover (*Trifolium repens*); sweet clover (*Meliletus alba*); cowpeas (*Vigna sinensis*); lespedesa (*Lespedeza cuneata*); Alaska peas (*Pisum sativum*); soybeans (*Glycine max*); and hairy vetch (*Vicia villesa*).

When sprays or dusts containing an arylsulfonamide as represented by the above formula are applied at the rate of about 8 pounds of herbicidal compound per acre to bluegrass or bentgrass turfs infested with foxtail seeds and crabgrass seeds germination of the latter is completely inhibited without harm to the established turf. Amounts as high as 16 pounds per acre of an herbicidally active arylsulfonamide do not harm turfs composed of bentgrasses, Bermuda grass, Kentucky bluegrass, centipede grass (*Erenochloa ephiuroides*); St. Augustine grass (*Stenotaphrum secundatum*), or Zoysia (*Zoysia japonica*, Meyer strain).

In addition to eliminating crabgrass, foxtail, goose grass, and other annual weed grasses from established lawns, the herbicidal compositions of this invention can be employed in other useful ways. For example, spray or dust compositions as provided by this invention can be used to eradicate crabgrass from a perennial flower bed or to destroy germinating seeds of Bermuda grass in a cotton field. Other methods of employing the selective herbicidal compositions of this invention will be readily apparent to those skilled in the art.

While all of the arylsulfonamides falling within the scope of the above formula show selective killing of grasses in the pre-emergent stage of growth, certain of the compounds, particularly those with a nitro group in the benzene ring in para position to the sulfonamide moiety, are especially advantageous in that they show some herbicidal action against broadleaf weeds such as seedlings of mustard (*Brassica juncea*) when applied at the rate of 8 to 10 pounds per acre to an area containing this weed.

A number of the herbicidal methods and compositions of the present invention are illustrated by the following specific examples.

EXAMPLE 1

The following experimental procedure was used to demonstrate the efficacy of the compositions of this invention in killing germinating grasses without affecting the germination of seeds and the growth of seedlings of various broadleaf and leguminous plants.

A soil was prepared consisting of one part masonry sand and one part shredded top soil blended together in a cement mixer. One gallon of this soil was placed in a 25 x 35 cm. galvanized flat and was patted down with a bench brush until level. A three-row marker was used to make 2½ cm. furrows in approximately two-fifths of the flat. Crop seeds consisting of four kernels of corn, five cotton seeds, and five soybean seeds were placed in these furrows. A four-row template was then placed on the remaining soil and the indicated amounts of each of the following seeds were planted, one species to each section: foxtail, 100 mg.; broadleaf mustard (*Brassica juncea*), 50–75 mg.; rough pigweed (*Amaranthus retroflexus*), 30–50 mg.; and large crabgrass, 350–400 mg. Sufficient soil was added to cover the entire flat. Thus, the weed seeds were covered to a depth of about 6 mm. and the crop plant seeds were covered to a depth of about 3 cm.

In assaying the effect of the compositions as pre-emergent herbicides, a flat prepared as above was placed in a chamber equipped with a turntable and an air exhaust. The herbicidal composition, whether it was a spray-type emulsion formulated from the growth-inhibiting compound in combination with a wetting agent and a non-phytotoxic, inert diluent such as acetone, cellosolve, ethanol, dimethylformamide, water, and the like, or a wettable powder, was applied to the flat with a modified DeVilbiss atomizer hooked to an air source. Twelve and one-half milliliters of the composition under test were applied to each flat either on the day of planting or the succeeding day. Injury ratings and observations as to type of injury were made eleven to twelve days after treatment. The injury rating scale used was as follows:

| | |
|---|---|
| 0 | No injury. |
| 1 | Slight injury. |
| 2 | Moderate injury. |
| 3 | Severe injury. |
| 4 | Death. |

When more than one determination was carried out, an average value was calculated for the injury rating.

The table which follows sets forth the results of pre-emergent testing of several arylsulfonamides. In the table, column 1 gives the name of the compound; column 2, the rate in terms of pounds per acre at which the compound was applied to the test flat; and columns 3 to 9, the injury rating for the particular plant seedlings.

INJURY RATING ON PRE-EMERGENT TREATMENT

| Compound | Lb./acre | Corn | Cotton | Soybeans | Crabgrass | Mustard | Pigweed | Foxtail |
|---|---|---|---|---|---|---|---|---|
| N¹-acetylsulfanilamide | 2 | 0 | 0 | 0 | 3 | 2 | 0 | 0 |
|  | 4 | 0 | 0 | 0 | 3 | 3 | 1 | 1 |
|  | 8 | 0 | 0 | 0 | 4 | 3 | 2 | 2 |
| N¹,N⁴-diacetylsulfanilamide | 2 | 0 | 0 | 0 | 3 | 1 | 0 | 0 |
|  | 4 | 0 | 0 | 0 | 3 | 3 | 1 | 0 |
|  | 8 | 0 | 0 | 0 | 3 | 3 | 1 | 2 |
| N¹-benzoylsulfanilamide | 2 | 0 | 0 | 0 | 2 | 2 | 1 | 0 |
|  | 8 | 0 | 0 | 0 | 3 | 4 | 2 | 3 |
| N¹-α-thenyolsulfanilamide | 2 | 0 | 0 | 0 | 1 | 2 | 0 | 0 |
|  | 8 | 0 | 0 | 0 | 3 | 3 | 1 | 2 |
| N¹,N⁴-bis-trichloroacetylsulfanilamide | 2 | 0 | 0 | 0 | 1 | 0 | 0 | 0 |
|  | 8 | 0 | 0 | 0 | 3 | 0 | 3 | 1 |

TABLE—Continued

| Compound | Lb./acre | Corn | Cotton | Soybeans | Crabgrass | Mustard | Pigweed | Foxtail |
|---|---|---|---|---|---|---|---|---|
| N¹-p-methoxy-benzoylsulfanilamide | 2 | 0 | 0 | 0 | 2 | 1 | 1 | 0 |
|  | 4 | 0 | 0 | 0 | 3 | 2 | 1 | 0 |
|  | 8 | 0 | 0 | 0 | 3 | 3 | 3 | 2 |
| N⁴-succinyl-N¹-benzoylsulfanilamide | 2 | 0 | 0 | 0 | 1 | 1 | 0 | 0 |
|  | 8 | 0 | 0 | 0 | 3 | 3 | 2 | 3 |
| N¹-(2-chlorobenzoyl)-sulfanilamide | 2 | 0 | 0 | 0 | 1 | 1 | 0 | 2 |
|  | 8 | 0 | 0 | 0 | 2 | 3 | 2 | 3 |
| N¹-acetyl-N¹-methyl-p-nitro-benzenesulfonamide | 2 | 0 | 0 | 0 | 0 | 0 | 0 | 0 |
|  | 8 | 0 | 0 | 0 | 3 | 2 | 1 | 2 |
| N-acetyl-p-nitro-benzenesulfonamide | 2 | 0 | 0 | 0 | 3 | 3 | 1 | 3 |
|  | 4 | 0 | 0 | 0 | 3 | 3 | 1 | 3 |
|  | 8 | 0 | 0 | 0 | 4 | 3 | 2 | 4 |
| N¹-acetyl-N¹-methylsulfanilamide | 2 | 0 | 0 | 0 | 0 | 0 | 0 | 0 |
|  | 8 | 0 | 0 | 0 | 3 | 2 | 2 | 3 |
| N-chloroacetyl-p-nitrobenzenesulfonamide | 2 | 0 | 0 | 0 | 1 | 0 | 0 | 0 |
|  | 8 | 0 | 0 | 0 | 3 | 0.5 | 1 | 2.5 |
| N-benzoyl-p-nitro-benzenesulfonamide | 2 | 0 | 0 | 0 | 3 | 3 | 2 | 1 |
|  | 8 | 0 | 0 | 0 | 3 | 3 | 2 | 3 |
| N-isobutyryl-p-nitrobenzenesulfonamide | 2 | 0 | 0 | 0 | 1 | 0 | 0 | 1 |
|  | 8 | 0 | 0 | 0 | 3 | 3 | 2 | 3 |
| N-trichloroacetylsulfanilyl-N-vinylamine | 2 | 0 | 0 | 0 | 1 | 0 | 0 | 1 |
|  | 8 | 0 | 0 | 0 | 3 | 3 | 2 | 3 |
| N⁴-acetylsulfanilamide, sodium salt | 2 | 0 | 0 | 0 | 0 | 0 | 0 | 0 |
|  | 8 | 0 | 0 | 0 | 3 | 2 | 0 | 0 |
| 3-sulfanilylpentane | 2 | 0 | 0 | 0 | 0 | 0 | 0 | 0 |
|  | 8 | 0 | 0 | 0 | 3 | 3 | 0 | 0 |
| Trichloroacetyl sulfanilylallylamide | 2 | 0 | 0 | 0 | 1 | 0 | 0 | 0 |
|  | 8 | 0 | 0 | 0 | 4 | 1 | 1 | 2 |

As is well understood in the art, the rates of application of herbicide required to produce a given result under the carefully controlled conditions of the greenhouse can be from a half to a fourth those required in the field.

N¹,N⁴-diacetylsulfanilamide, tested according to the method described above, was formulated as a spray as follows: 12 g. compound was dissolved in 250 ml. of acetone, to which solution was added 2250 ml. of an aqueous solution containing 0.1 percent polyoxyethylene sorbitan mono-laurate as wetting agent or surfactant. Application of this formulation provided the growth-inhibitory compound at a rate of 8 pounds per acre. By dilution with the aqueous solution of the wetting agent, the concentration of the growth-inhibitory compound could be easily adjusted.

EXAMPLE 2

In addition to the spray formulation described above, the herbicidally-active compounds within the scope of the invention can be formulated as dispersion on vermiculite as the inert diluent. N¹-acetylsulfanilamide was dissolved in acetone and the solution allowed to contact the vermiculite, whereby the active ingredient was adsorbed onto the vermiculite, which was then separated and dried. Sufficient compound was used so that the resulting dispersion contained 10 percent by weight of the herbicidally-active ingredient.

The arylsulfonamides useful in the herbicidal process and composition of this invention can be synthesized by reaction of an acid chloride with a suitable sulfonamide dissolved in an organic solvent in the presence of a basic reagent, according to the process disclosed by J. R. Geigy A.-G., Swiss Patent No. 228,335 (Nov. 1, 1943). The following will serve to illustrate such a preparation, yielding N-acetyl-N-methyl-p-nitrobenzene-sulfonamide: A solution, prepared by dissolving 4 g. sodium hydroxide in 250 ml. water and adding 21.6 g. N-methyl-p-nitrobenzenesulfonamide with stirring, was filtered to remove insoluble impurities and the filtrate concentrated to dryness in vacuo to yield the sodium salt of N-methyl-p-nitrobenzenesulfonamide. This salt was powdered with mortar and pestle and suspended in 250 ml. acetone in a round-bottom flask, 9.5 ml. acetyl chloride were added slowly, and the reaction mixture stirred at room temperature one hour.

The product, N-acetyl-N-methyl-p-nitrobenzenesulfonamide, was filtered off and washed first with a little water then a little hot ethanol. Additional product was obtained by concentrating the filtrate and diluting the concentrate with water. Total yield was 23.5 g. of melting point about 148–152° C.

*Analysis.*—Calc.: C, 41.85%; H, 3.88%; N, 10.85%. Found: C, 42.15%; H, 3.95%; N, 10.95%.

We claim:

1. A method for inhibiting the growth of germinating grass seeds and of seedling grasses which comprises applying to a locus of said seeds and seedlings an effective amount of a compound having the following formula:

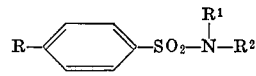

wherein R is a member of the group consisting of —NO₂, —NH₂, and —NHCO—R³; R¹ is a member of the group consisting of hydrogen, $C_1$–$C_6$ alkyl, and $C_2$–$C_4$ alkenyl; R³ is a member of the group consisting of $C_1$–$C_6$ alkyl, $C_1$–$C_6$ haloalkyl, monocyclic aryl, and substituted monocyclic aryl; and R² is a member of the group consisting of hydrogen and —CO—R³.

2. The method of claim 1 wherein said compound is applied in combination with an inert diluent.

3. The method of claim 1 wherein said compound is applied in combination with a surfactant and an inert diluent.

4. The method of claim 1 wherein said compound is applied at a rate between about 5 and about 30 pounds per acre.

5. The method of claim 1 wherein N-acetyl-p-nitrobenzenesulfonamide is the growth-inhibitory compound.

6. The method of claim 1 wherein N¹-acetylsulfanilamide is the growth inhibitory compound.

7. The method of claim 1 wherein N¹,N⁴-diacetylsulfanilamide is the growth-inhibitory compound.

8. The method of claim 1 wherein N-benzoyl-p-nitrobenzenesulfonamide is the growth-inhibitory compound.

9. A method for the control of weeds which comprises treating the medium containing the weeds with a herbicidal amount of a compound of the formula:

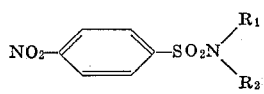

wherein $R_1$ is selected from the group consisting of hydrogen and lower alkenyl and $R_2$ is hydrogen.

10. A method for the control of weeds which comprises treating the medium containing the weeds with a herbicidal amount of a compound of the formula:

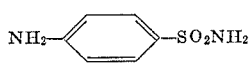

11. A method for the control of weeds which comprises applying to a locus of said weeds a herbicidal amount of a compound of the formula:

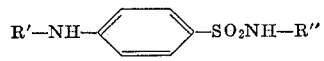

wherein R' and R'' are hydrogen ar acetyl.

12. A method for the control of weeds which comprises treating the medium containing the weeds with a herbicidal amount of a compound of the formula:

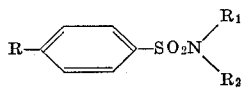

wherein R is selected from the group consisting of nitro and amino; $R_1$ is selected from the group consisting of hydrogen, lower alkyl and lower alkenyl and $R_2$ is hydrogen.

References Cited

UNITED STATES PATENTS 2,964,538  12/1960  Kundiger et al. _____ 71—2.6 X
823,970   12/1951  Gundel et al. _____ 71—2.3

OTHER REFERENCES

Noltsch et al., German application 1091419, Oct. 20, 1960, 2 pp. spec., no drawing, 71—2.3.

Tsyganor et al., Chemical Abstracts, vol. 41, col. 5687–1947.

JAMES O. THOMAS, JR., Primary Examiner

U.S. Cl. X.R.
71—88, 90, 94